(12) United States Patent
Behairy et al.

(10) Patent No.: US 10,051,551 B2
(45) Date of Patent: Aug. 14, 2018

(54) SELECTIVE CONTROL OF MOBILE DEVICES FOR PROTECTING HIGH SPEED MOVING CONVOY

(71) Applicant: King Abdulaziz City for Science and Technology, Riyadh (SA)

(72) Inventors: Hatim M. Behairy, Riyadh (SA); Adnan A. Alghammas, Riyadh (SA); Waleed S. Alrobian, Riyadh (SA); Amr Alasaad, Riyadh (SA)

(73) Assignee: KING ABDULAZIZ CITY FOR SCIENCE AND TECHNOLOGY, Riyadh (SA)

( * ) Notice: Subject to any disclaimer, the term of this patent is extended or adjusted under 35 U.S.C. 154(b) by 179 days.

(21) Appl. No.: 14/723,902

(22) Filed: May 28, 2015

(65) Prior Publication Data
US 2016/0353354 A1 Dec. 1, 2016

(51) Int. Cl.
*H04W 48/04* (2009.01)
*H04K 3/00* (2006.01)
*H04W 84/00* (2009.01)

(52) U.S. Cl.
CPC .............. *H04W 48/04* (2013.01); *H04K 3/28* (2013.01); *H04K 3/40* (2013.01); *H04K 3/415* (2013.01);
(Continued)

(58) Field of Classification Search
CPC ............ H04K 3/40; H04K 3/415; H04K 3/60; H04K 3/65; H04K 3/92; H04K 3/28; H04K 3/42; H04K 3/43; H04W 48/04
(Continued)

(56) References Cited

U.S. PATENT DOCUMENTS 8,346,241 B2  1/2013  Behairy et al.
8,417,237 B2  4/2013  Behairy et al.
(Continued)

FOREIGN PATENT DOCUMENTS

WO   WO1998056192   12/1998
WO   WO2007106694    9/2007

OTHER PUBLICATIONS

Kihl et al..,"Inter-Vehicle Communication Systems:A Survey" IEEE Communications, 2nd Quarter 2008, vol. 10, No. 2 , 18 pp.
(Continued)

*Primary Examiner* — King Poon
*Assistant Examiner* — Vincent Peren
(74) *Attorney, Agent, or Firm* — Andrew M. Calderon; Roberts Mlotkowski Safran Cole & Calderon, P.C.

(57) ABSTRACT

An approach includes a method implemented in a computer infrastructure having computer executable code tangibly embodied in a computer readable storage medium having programming instructions. The approach further includes the programming instructions configured to collect at least one broadcast control channel allocation list from base stations in a surrounding area. The approach further includes the programming instructions configured to generate a list of power signals which correspond to all broadcast control channel carriers based on the at least one broadcast control channel allocation list. The approach further includes the programming instructions configured to transmit information of a highest carrier power in the list to all virtual base stations in a convoy.

20 Claims, 6 Drawing Sheets

(52) U.S. Cl.
CPC .............. *H04K 3/42* (2013.01); *H04K 3/60* (2013.01); *H04K 3/65* (2013.01); *H04W 84/005* (2013.01)

(58) Field of Classification Search
USPC ........................................ 455/450
See application file for complete search history.

(56) References Cited

U.S. PATENT DOCUMENTS

| | | |
|---|---|---|
| 8,428,574 B2 | 4/2013 | Behairy et al. |
| 8,700,026 B2 | 4/2014 | Behairy et al. |
| 8,750,903 B1 | 6/2014 | Fitzsimmons et al. |
| 2006/0121910 A1* | 6/2006 | Willey ............... H04W 76/02 455/450 |
| 2009/0209196 A1* | 8/2009 | Haverty ............... H04K 3/28 455/1 |
| 2010/0311403 A1* | 12/2010 | McNally ............ H04W 48/02 455/419 |
| 2012/0244834 A1 | 9/2012 | Behairy et al. |
| 2012/0244860 A1* | 9/2012 | Behairy ............. H04W 4/021 455/434 |
| 2013/0316678 A1 | 11/2013 | Brisebois et al. |
| 2013/0316738 A1* | 11/2013 | Noonan ............. H04W 8/005 455/456.4 |

OTHER PUBLICATIONS

Nickel et al.,"Responsive Communications Jamming Against Radio-Controlled Improvised Explosive Devices" IEEE Communications Magazine, Oct. 2012, 9 pp.

* cited by examiner

| Mobile Device 400 | Identity 410 | Location 420 | Vehicle 430 | Access 440 |
|---|---|---|---|---|
| Mobile Device 230 | Unknown | Unknown | Unknown | Not Granted |
| Mobile Device 350 | 10829 | Coverage Area 330 | Vehicle 140 | Granted |

SELECTIVE CONTROL OF MOBILE DEVICES FOR PROTECTING HIGH SPEED MOVING CONVOY

FIELD OF THE INVENTION

The invention relates to a mobile communication system and, more particularly, to a method and apparatus of selectively controlling mobile devices within a high speed moving convoy.

BACKGROUND OF THE INVENTION

A mobile device jammer may be employed to restrict access to a mobile device by preventing the mobile device from receiving a cellular signal from a cell tower and/or transmitting the cellular signal to the cell tower. However, the use of the mobile device jammer may be illegal in certain jurisdictions. Moreover, signals generated by the jammer to restrict access to a mobile device may disrupt the functionality of other sensitive electronic equipment (e.g., a pacemaker). As a result, the use of the jammer may not be feasible in certain locations.

SUMMARY OF THE INVENTION

In a first aspect of the invention, a method is implemented in a computer infrastructure having computer executable code tangibly embodied in a computer readable storage medium having programming instructions. The programming instructions are further configured to collect at least one broadcast control channel allocation list from base stations in a surrounding area. The programming instructions are further configured to generate a list of power signals which correspond to all broadcast control channel carriers based on the at least one broadcast control channel allocation list. The programming instructions are further configured to transmit information of a highest carrier power in the list to all virtual base stations in a convoy.

In another aspect of the invention, there is a computer program product comprising a computer readable storage medium having program instructions embodied therein. The computer readable storage medium is not a transitory signal per se. The program instructions are readable by a computing device to cause the computing device to perform a method including receiving a highest carrier power associated with power signals of base stations in a surrounding area. The program instructions further include transmitting a signal which is higher than the highest carrier power of the base stations in the surrounding area. The program instructions further include receiving identification information from at least one device. The program instructions further include controlling the at least one device in response to a match or mismatch of the received identification information associated with the at least one device with identification information in a database.

In yet another aspect of the invention, a computer system for providing at least one service includes a CPU, a computer readable memory, and a computer readable storage media. The system further includes first program instructions to generate and transmit a signal which is stronger than any wireless signal associated with a wireless service in a surrounding area. The system further includes second program instructions to receive identification information from a device in response to transmitting the signal which is stronger than any wireless signal associated with the wireless signal in the surrounding area. The system further includes third program instructions to verify that the received identification information matches identification information in a database. The system further includes fourth program instructions to send a service denial message to the device to cause the device to connect to the wireless service in the surrounding area in response to verifying that the received identification information matches the identification information in the database. The first, second, third, and fourth program instructions are stored on the computer readable storage media for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention relates to a mobile communication system and, more particularly, to a method and apparatus for selectively controlling mobile devices located close to a high speed moving convoy. More specifically, embodiments of the invention relate to a method and apparatus for protecting a very important person (VIP) riding in a convoy from any possible terrorist threat imposed by a mobile device. For example, a mobile device may be used to impose a terrorist threat on the VIP by remotely triggering improvised explosive devices (IED) located near an area where a high speed moving convoy is driving. In this scenario, embodiments of the invention can prevent the triggering of the IED.

In a high speed convoy scenario, the processing time to receive a join request at a virtual Base Transceiver Station (vBTS) in a convoy car from a surrounding mobile phone and perform a database matching and other operations required by known systems in order to control the mobile device is relatively high. Therefore, in known systems, the mobile device may not be able to be controlled in a high speed convoy scenario. To accommodate such issues in a high speed convoy, the systems and methods described herein provide a listener positioned ahead of the high speed convoy to collect information about frequency bands used by base stations in the surrounding area and the signal power received from surrounding base stations. Positioning the listener ahead of the high speed convoy allows adequate time for the listener to collect information about a broadcast control channel allocation list (i.e., BA list) of all neighboring base stations and send this information to all virtual base transceiver stations (vBTSs) in the convoy. Therefore, any of the vBTSs in the convoy may assign a proper power to a broadcast control channel ($P_{BCCH}$) and execute other required operations ahead of time such that all mobile devices can be controlled by the systems and methods described herein once any mobile device enters into a coverage area of the system.

In embodiments, a convoy system can be used to protect officials (e.g., very important person, or VIP) who are driving within a convoy from mobile devices in the surrounding area which may cause a terrorist threat when they are used to remotely ignite an explosive system. In embodiments, the convoy system is configured to control mobile phone access to base stations which are located in an area around the convoy. For example, the convoy system and methods herein can prevent the mobile phones from receiving or transmitting any communications over the mobile networks (e.g., GSM, LTE, CDMA, etc.), if they are within a coverage area of the convoy system (i.e., a coverage area around the convoy). In embodiments, a system administrator can use a pre-identified white list to allow certain mobile devices access to base stations of the mobile network operator. The white list is defined as a list of mobile users who will have access to mobile communication services without interruption.

In embodiments, a virtual base transceiver station (vBTS) is included in a number of high speed convoy vehicles in a way that extends a coverage area of a convoy communication system. Each of the vBTS in the convoy communication system mimics a real network mobile base station. In other words, once a mobile phone is within the coverage area of the convoy communication system, the mobile phone receives a base control channel (BCCH) signal from a vBTS, and will then attempt to connect to that vBTS (because the signal from the vBTS is the highest signal power in comparison to all other mobile operator base stations in the area). When the mobile phone connects to the vBTS, the vBTS will interrogate the mobile phone for its identity (e.g., international mobile subscriber identity (IMSI) number and/or international mobile station equipment identify (IMEI) number). Upon receipt of the IMSI/IMEI numbers, the vBTS will match the mobile phone with a white list stored in a database of the vBTS. If the mobile phone is not in the white list, the vBTS holds on to the mobile phone and does not provide any service to the mobile phone. Thus, the mobile phone is prevented from receiving services from the mobile network operators and consequently prevents this mobile device from receiving or transmitting any communication signals. Alternatively, if the mobile phone is in the white list, the vBTS rejects the connection request, which allows the mobile phone to connect to other base stations in the vicinity and resume mobile services from the mobile network operator.

In more specific embodiments, a listener (e.g., a vehicle equipped with a sensitive receiving radio) is positioned ahead of a convoy and collects frequency bands from base stations in the surrounding area in order to collect BCCH signals from the surrounding base stations. Then, the listener transmits information about the strongest BCCH signal of all surrounding base stations to all vBTS in the convoy. All identical vBTSs then generate a carrier BCCH signal which has a higher power than the strongest signal of the surrounding base stations and transmit the generated carrier signal. As the generated carrier signal is the strongest signal in the surrounding area, all mobile devices which fall in the coverage area of the convoy control system will be attracted to connect to at least one of the vBTS by sending its identification information to a vBTS. The vBTS then verifies whether the identification information of that mobile device matches information in a database (e.g., the white list). If the identification information of that mobile device matches information in the database, the vBTS sends a service denial message to the at least one mobile device. In this way, the mobile device will be dropped from the vBTS and will then be able to connect to the network of the mobile network operator through one of the surrounding base stations and resume service accordingly. Alternatively, if the identification information of the mobile device does not match information in the database, the vBTS keeps a connection to that mobile device. In this way, the mobile device will not be able to access the surrounding base stations, will be prevented from connecting to any mobile network, and consequently will not cause any threat to the convoy.

System Environment

Although the systems and methods described hereafter with regard to exemplary methods, and/or computer program products, it should be understood that other implementations are also contemplated by the present invention as described herein. For example, other devices, systems, appliances, and/or computer program products according to embodiments of the invention will be or become apparent to one of ordinary skill in the art upon review of the following drawings and detailed description. It is intended that all such additional other devices, systems, appliances, processes, and/or computer program products be included within this description and within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, any non-transitory storage medium, device, or system including an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Figure 1:
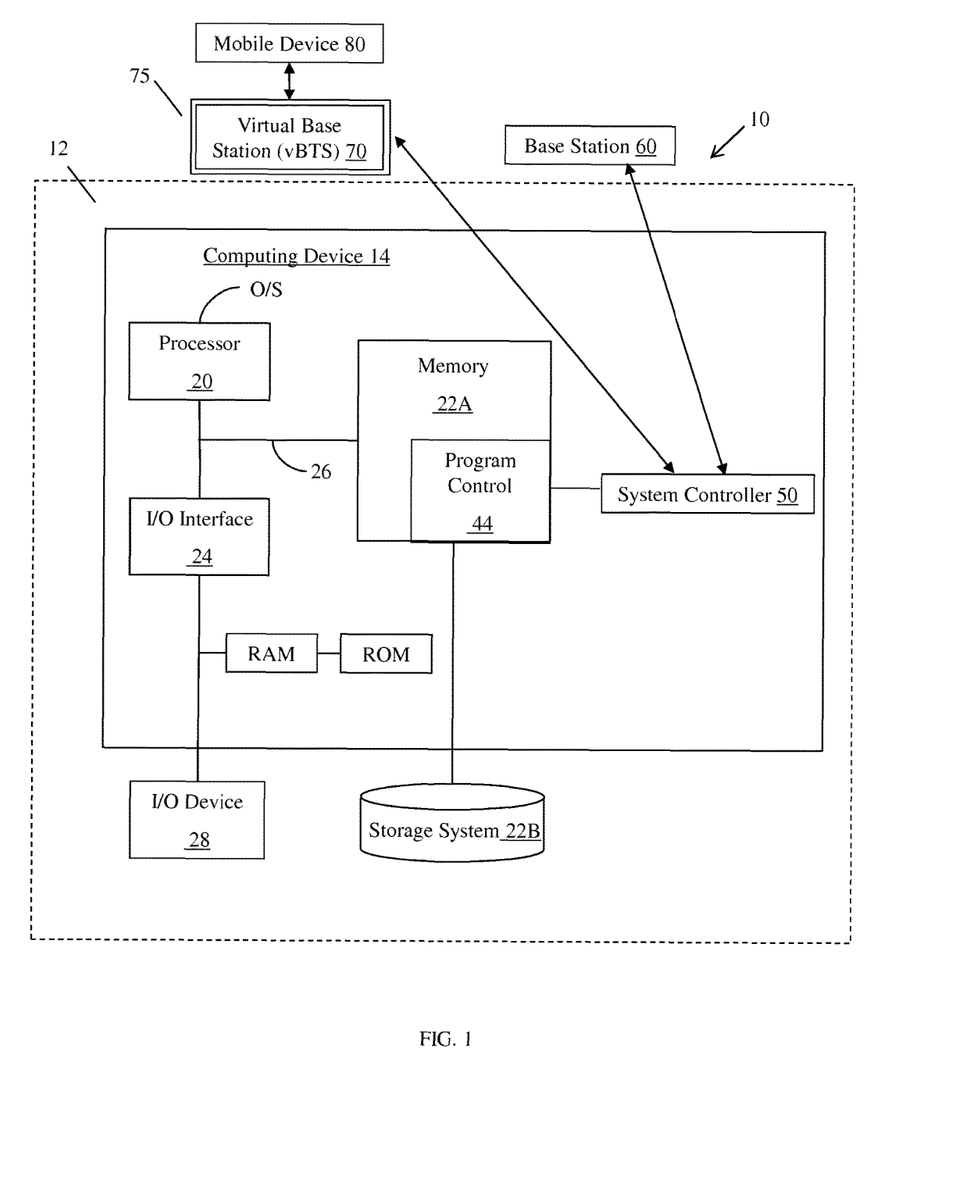
FIG. 1 shows an illustrative environment for implementing the steps in accordance with aspects of the present invention.

FIG. 1 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S). In embodiments, the illustrative environment 10 may be provided in a listening vehicle which is in front of a convoy by a predetermined distance.

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, system controller 50 may be configured to collect information (such as a broadcast control channel allocation list, or BA list) on frequency bands used by at least one base station 60 in the surrounding area. System controller 50 may be configured to apply a technique on these BA lists from the at least one base station 60 and identify a set of frequency channels that are shared in all received BA lists. Then, the system controller 50 may be configured to communicate a signal corresponding to a highest carrier signal power of the received BA lists to the at least one virtual base transceiver station (vBTS) 70 in a vehicle 75 As the at least one vBTS 70 now has the highest carrier signal power received from the system controller (of a listening vehicle), the at least one vBTS 70 can transmit a carrier signal with a power higher than the received highest carrier signal power of all received BA lists to the mobile devices 80. As the carrier signal is more powerful than any of the base stations 60, the at least one mobile device 80 will attempt to connect to the at least one vBTS 70 by sending its identification information to the at least one vBTS 70. The at least one vBTS 70 will then determine whether the at least one mobile device 80 is in a database, and then control the at least one mobile device 80 based on the determination. That is, if the at least one mobile device 80 is in a database it will then provide a denial of service which, in turn, will allow the mobile device 80 to connect with its operator mobile network base station 60 for communication to the outside.

Figure 2:
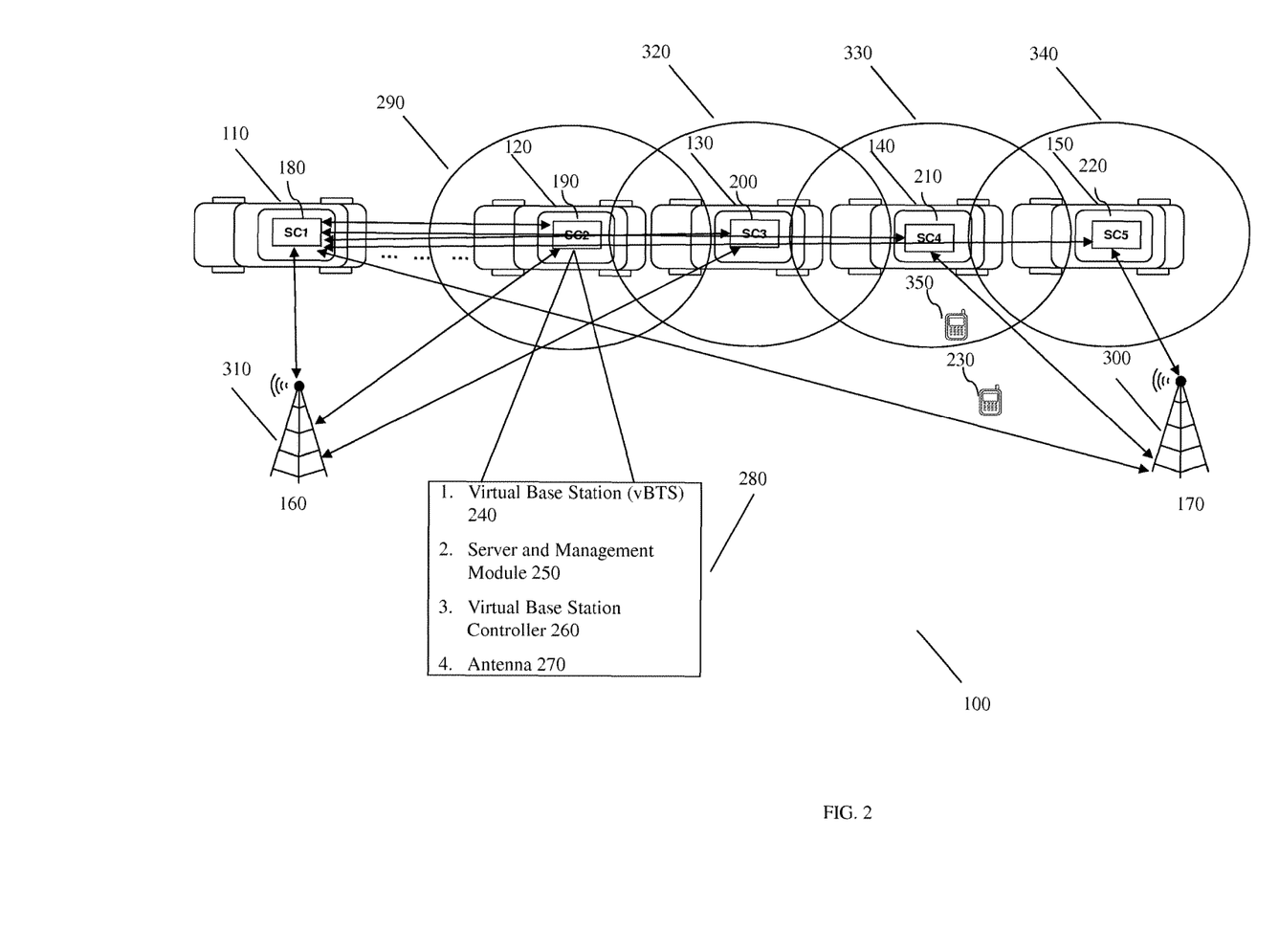
FIG. 2 shows a schematic representation of a mobile communication system in accordance with aspects of the present invention.

FIG. 2 shows a view of a mobile communication system in accordance with aspects of the present invention. More specifically, FIG. 2 depicts a mobile communication system 100 which comprises vehicles 110, 120, 130, 140, and 150. These vehicles respectively include system controllers 180, 190, 200, 210, and 220 (e.g., SC1, SC2, SC3, SC4, and SC5). As shown in FIG. 2, vehicles 120, 130, 140, and 150 each have respective coverage areas 290, 320, 330, and 340. Each of the coverage areas 290, 320, 330, and 340 are areas where mobile devices can be controlled by the mobile communication system 100 in accordance with aspects of the present invention. Although FIG. 2 shows an embodiment in which vehicles 110, 120, 130, 140, and 150 follow each other in a straight line, other vehicle arrangements can be included in embodiments of the present invention (e.g., diagonal arrangement, side by side arrangement, paired arrangement, etc.) to shape and extend the coverage area to increase the safety zone of the convoy.

Also, in embodiments of FIG. 2, vehicle 110 (head vehicle) is a listener while vehicles 120, 130, 140, and 150 are part of a convoy. More specifically, vehicle 110 (e.g., the listener) may lead the convoy by a predetermined distance (e.g., 500 m or greater), collect information about frequency bands used by base stations in the surrounding area, and send a carrier signal corresponding to the highest received BCCH to every virtual base transceiver station (vBTS) in the convoy.

FIG. 2 further shows mobile network operators 160, 170 which may connect to cell sites 300, 310 to provide mobile network services for mobile phone subscribers associated with mobile communication system 100.

Moreover, each of the system controllers 180, 190, 200, 210, and 220 (e.g., SC1, SC2, SC3, SC4, and SC5) are shown as a system controller 280 (similar to system controller 50 in FIG. 1) to imitate the role of mobile operator base stations and attract mobile devices in the surrounding area to connect to them by sending the highest BCCH carrier signal. Further, a system controller 280 comprises a virtual base transceiver station (vBTS) 240 executing on a single base transceiver station (BTS) platform associated with base station controller 260, virtual base station controller 260, a server and management module 250, and an antenna 270.

In embodiments, virtual base station controller 260 is used to configure the carrier signal according to information received by the listener. In embodiments, base station controller 260 may handle allocation of radio channel(s) to a mobile device (e.g., one of system controllers 180, 190, 200, 210, and 220). Further, in embodiments, the server and management module 250 is associated with the virtual base station controller 260. A server in the server and management module 250 may be an application server, an e-mail server, communications server, web server, file server, central management server, etc. Further, the server in the server and management module 250 may communicate with one of mobile network operators 160, 170 based on a set of instructions configured to execute on a processor included in the server and management module 250. The server in the server and management module 250 may also comprise an associated memory.

In embodiments, the vBTS 240 may comprise one or more BTSs coupled to the virtual base station controller 260 through a local area network (LAN) or a Transmission Control Protocol (TCP) connection. In embodiments, each of the one or more BTSs may comprise antenna 270, which has an associated coverage area (e.g., for each vBTS 240). In embodiments, antenna 270 may comprise multiple antennas having different coverage areas.

In FIG. 2, vehicles 120, 130, 140, and 150 each have respective coverage areas 290, 320, 330, and 340. Further, in FIG. 2, vehicle 110 (i.e., the listener) may not be configured to have a coverage area. However, embodiments are not limited, and in an alternative embodiment, vehicle 110 may be configured to have a coverage area. As each of the vehicles 120, 130, 140, and 150 may comprise a virtual base station 240, the entire coverage area is a combination of each coverage range of every vBTS. For example, vehicle 120 may comprise coverage area 290, vehicle 130 may comprise coverage area 320, vehicle 140 may comprise coverage area 330, and vehicle 150 may comprise coverage area 340. Thus, in embodiments, the entire coverage area comprises the combined coverage areas of 290, 320, 330, and 340. In embodiments, each of the coverage areas 290, 320, 330, and 340 may be identical and may be separated from each other by a distance less than or equal to a coverage range of every vBTS in the corresponding vehicle.

As shown in FIG. 2, the coverage areas 290, 320, 330, and 340 may overlap each other. The entire combined coverage area, which comprises identical coverage areas 290, 320, 330, and 340, improves an overall coverage area of the mobile communication system 100. In contrast, in known systems, if only one vBTS is used, coverage may be limited, e.g., approximately 100 meters. Mobile device 350, which is not part of the convoy, may be in coverage area 330; whereas, mobile device 230, also not part of the convoy, may be out of any of the coverage areas 290, 320, 330, and 340.

Moreover, in FIG. 2, although five vehicles (e.g., vehicles 110, 120, 130, 140, and 150) are shown, embodiments are not limited to such a configuration. Therefore, a number of vehicles can be any number greater than or equal to 2 vehicles. Further, in embodiments of FIG. 2, there may be only four virtual base stations 240, one in each of the vehicles 120, 130, 140, and 150 (i.e., in this scenario, vehicle 110 would not comprise any virtual base station or coverage area).

In FIG. 2, vehicle 110 (i.e., the listener) includes a wide-band receiver. This vehicle 110 leads the convoy (e.g., vehicles 120, 130, 140, and 150) by a predetermined distance that is dependent on a speed of the convoy and the required time period to provide the processes described herein. For example, the predetermined distance between the vehicle 110 (i.e., the listener) and the convoy may be smaller when the convoy is moving at a slow speed than when the convoy is moving at a high speed. The predetermined distance is set to allow for enough processing of mobile join requests based on a convoy speed. The predetermined distance may be large when the convoy speed is high (e.g., above 45 km/hr).

By way of example, if the convoy is passing by a stationary device in the surrounding area by a speed of 100 km/hr and the combined coverage range of the convoy is 100 m, a mobile device will enter and then leave the combined coverage area of the convoy in only 3.6 seconds. Thus, known systems do not have enough time to configure the vBTS in each vehicle of the convoy to send the BCCH carrier and attract mobile devices to send their IMSE number. Thus, known systems may fail to control any mobile device in the surrounding area.

In contrast, in FIG. 2, vehicle 110 (i.e., the listener) is ahead of the convoy by the predetermined distance (e.g., 500 m or greater) to allow enough time to collect information about the surrounding mobile network base stations and share this information with all vBTS in the convoy. Further, in the convoy of FIG. 2, the large number of vBTSs creates a large combined coverage area that allows for enough processing time of the mobile device join requests.

In embodiments shown in FIG. 2, vehicle 110 (i.e., the listener) includes a wide-band receiver that collects all information about frequency bands and BCCH carriers used by base stations (e.g., cell sites 300, 310) in the surrounding area. The wide-band receiver has a higher sensitivity in order to enable improved detection of broadcast control channel (BCCH) carriers. Vehicle 110 continuously receives different BA lists from all base stations in the surrounding area, which comprises frequency bands used by that specific base station as well as other frequency bands used by neighboring base stations. In embodiments, vehicle 110 determines the power of all BCCH carriers in all BA lists received from the surrounding base stations and sends this information to all vBTSs in the convoy over dedicated control channels.

Still referring to FIG. 2, in operational use, the convoy (e.g., vehicles 120, 130, 140, and 150) consists of a number of vehicles which move along a road and follow each other in a line topology or other configuration as noted herein. Each vehicle in the convoy may carry a vBTS 240 and a virtual BSC 260. When information about BCCH carrier powers from all the BA lists is received at a vBTS, the vBTS transmits a broadcast control channel carrier (e.g., BCCHx) corresponding to the highest BCCH received from the listener. The vBTS transmits the BCCHx carrier at a power (PBCCHx) that is higher than the strongest signal which the listener has recorded such that:

PBCCHx=max (PBAlist)+k1, where k1 is a constant that can be configured according to the amount of power available at the vBTS.

Therefore, the approach described herein guarantees that any mobile device in the area at which the convoy is passing by is attracted by the carrier BCCHx and consequently a mobile device sends its IMEA/IMSA to that vBTS. In embodiments shown in FIG. 2, every vBTS in the convoy (e.g., vBTS2, vBTS3, vBTS4, and vBTS5) tunes to the BCCHx carrier corresponding to the highest signal power. Thus, mobile devices (e.g., mobile device 350) in the combined coverage area (e.g., coverage areas 290, 320, 330, and 340) will be attracted to the same BCCHx carrier transmitted by all vBTSs of the convoy at a power PBCCHx that is higher than the strongest BCCH signal which the listener has recorded from all surrounding base stations. Therefore, as the coverage is enhanced by the combined coverage area of all vBTS in the convoy (e.g., coverage areas 290, 320, 330, and 340), there is enough time for all mobile devices that enter into the combined coverage area to be controlled, even when the convoy is traveling at a high speed.

Upon receiving the IMEA/IMSA from a mobile device at the vBTS, the vBTS checks whether the IMEA/IMSA information is in the database of a white list. If it is not in the white list, the vBTS will hold on to the mobile device and will not provide a mobile network service. Alternatively, if the mobile device is in the white list, the vBTS will send a service denial message to the mobile device so that the mobile device can connect back to the network of the mobile operator.

In embodiments, mobile network operators (e.g., mobile network operators 160, 170) may be provided access to a database. Also, mobile devices entering the combined coverage area may be interrogated through a base station controller and the details may be captured and stored at the management and server module 250. In embodiments, the details associated with all the mobile devices within the combined coverage area may be available to mobile network operators and/or third parties. In embodiments, the wireless service associated with a mobile device (e.g., mobile device 350) may be disabled through a mobile network operator (e.g., one of mobile network operators 160, 170) when the mobile device is within the combined coverage area. Also, the wireless service associated with mobile device (e.g., mobile device 350) may be controlled through the mobile network operator (e.g., one of mobile network operators 160, 170) since this mobile device is within the combined coverage area. In contrast, a mobile device (e.g., mobile device 230), which is not in any of the coverage areas (e.g., coverage areas 290, 320, 330, and 340) would not be controlled by any of the virtual base transceiver stations (vBTSs) in the convoy.

Figure 3:
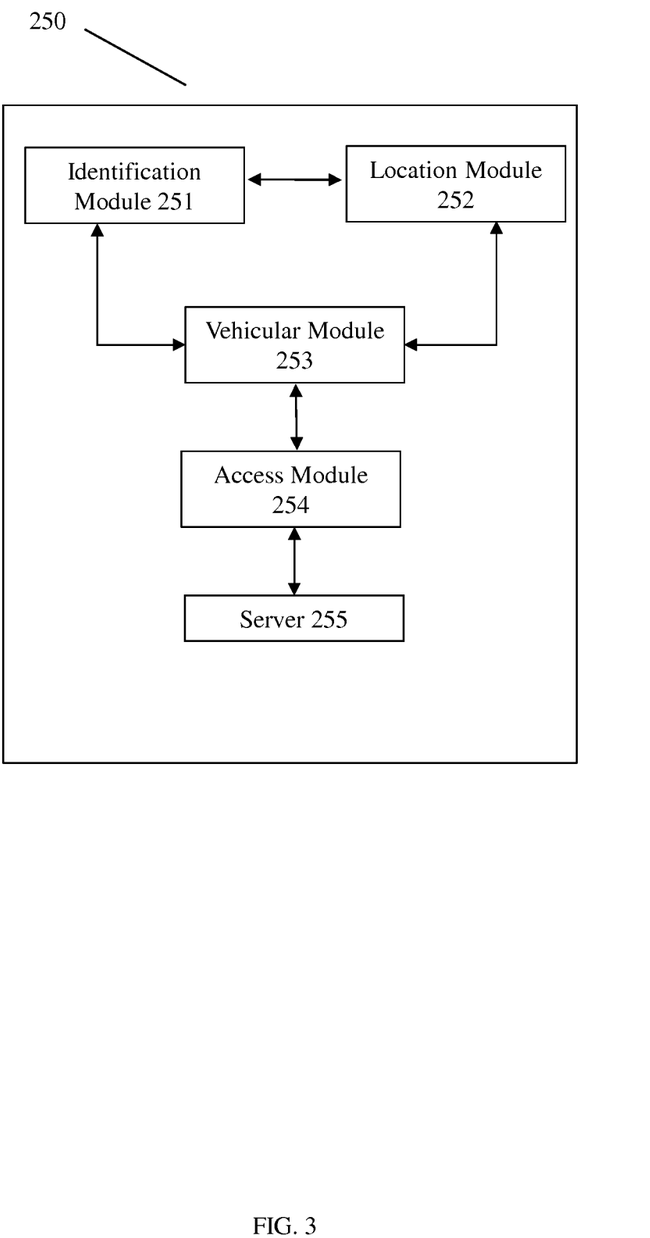
FIG. 3 shows a server and management module in accordance with aspects of the present invention.

FIG. 3 shows a server and management module in accordance with aspects of the present invention. In FIG. 3, server and management module 250 comprises an identification module 251, a location module 252, a vehicular module 253, an access module 254, and a server 255. In embodiments, wireless service to mobile devices may be controlled (e.g., allowed or denied) when the mobile devices are within regions requiring sensitivity (e.g., prayer halls, religious places of worship, cinema halls, hospitals, etc). Further, although FIG. 2 shows moving vehicles (e.g., vehicles 110, 120, 130, 140, and 150), an embodiment of the present invention also may apply when the moving vehicles come to a halt. In embodiments, any of the identification module 251, the location module 252, the vehicular module 253, and the access module 254 may reside as a set of instructions (e.g., software) in server 255 or may lie outside of the server and management module 250 as a hardware device comprising a processor.

In FIG. 3, identification module 251 may determine an identity of a mobile device (e.g., mobile device 350) inside the combined coverage area through an association of the mobile device with a signal of an antenna (e.g., antenna 270). In embodiments, an identity of the mobile device may be based on at least one of an IMSI number and an IMEI number. Further, location module 252 may determine a location of the mobile device based on detection through, e.g., an antenna (i.e., antenna 270), global positioning system (GPS), or triangulation methods. Further, location module 252 may also notify identification module 251 when the location of the mobile device is within the combined coverage area. Access module 254 may be configured to enable access to control of wireless signal(s) when the mobile device (e.g., mobile device 350) is within the combined coverage area. In embodiments, access module 254 may be configured to communicate with vehicular module 253.

In embodiments, the vehicular module 253 may relay information to the appropriate base station controller and/or base station (e.g., virtual base station controller 260) associated with server 255. For example, once the mobile device (e.g., mobile device 350) is within the combined coverage area, vehicular module 253 may relay location information and/or identification information to the appropriate base station controller and/or base station (e.g., virtual base station controller 260). Based on the identification information, access module 254 may enable access to control of wireless signal(s) to the mobile device to the system controller (e.g., system controller 280).

Figure 4:
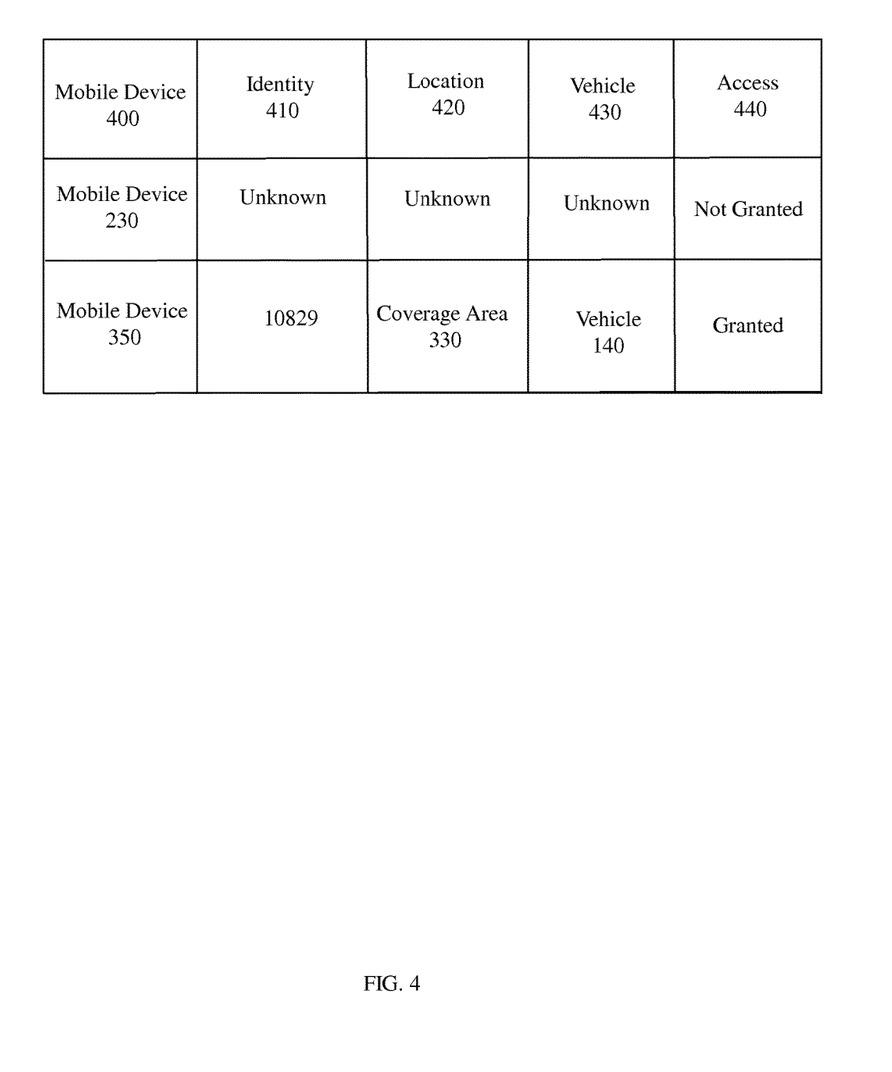
FIG. 4 shows a database of information associated with mobile devices in accordance with aspects of the present invention.

FIG. 4 shows a database of information associated with mobile devices in accordance with aspects of the present invention. More specifically, FIG. 4 shows a database of information associated with mobile devices stored at management and server module 250. In embodiments, the database may include fields such as mobile device 400, identity 410 (e.g., identification information associated with the corresponding mobile device), location 420 (e.g., within any of the coverage areas 290, 320, 330, and 340, or unknown), vehicle 430, and access 440 information (e.g., granted or not granted). However, the present invention contemplates other fields in the database shown in FIG. 4. For example, mobile device 350 may have associated unique identification information (e.g., 10829), which may be stored at the management and server module 250. As shown in FIG. 4, when mobile device 350 is within the coverage area 330, access to the wireless service associated with mobile device 190 may granted to a base station controller (e.g., virtual base station controller 260).

Figure 5:
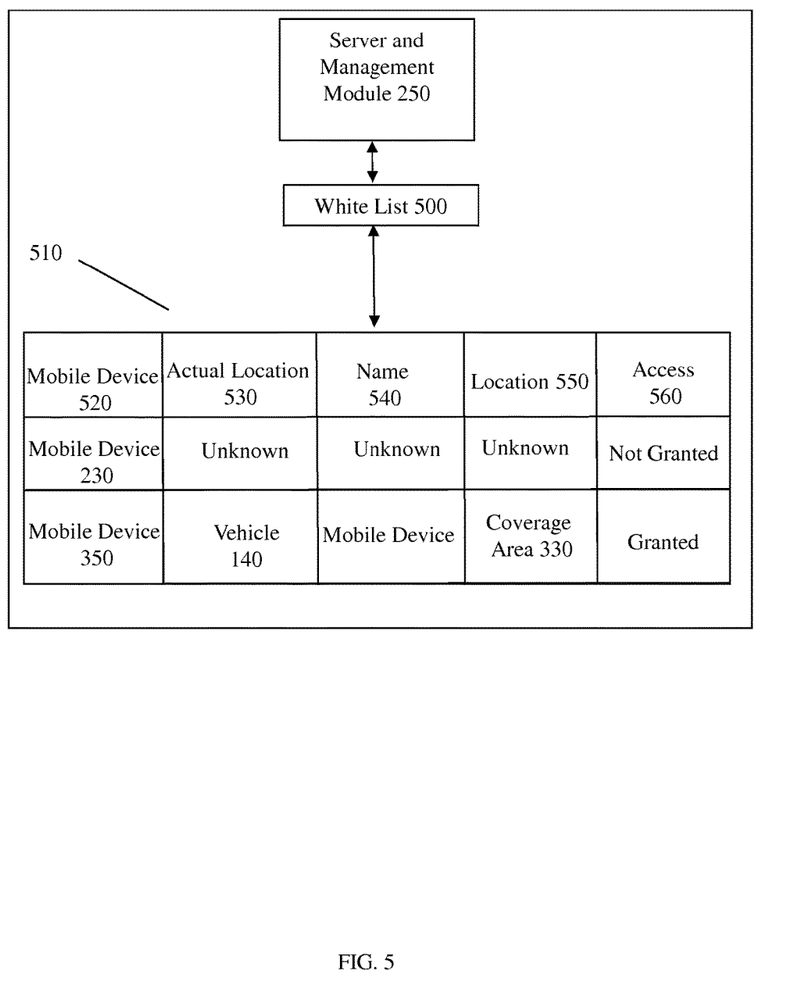
FIG. 5 shows a white list in accordance with aspects of the present invention.

FIG. 5 shows a white list in accordance with aspects of the present invention. In FIG. 5, white list 500 may be stored in the server and management module 250 (e.g., in server 255) or hardcoded into a vBTS. In an embodiment, based on a presence or absence of a database 510 in the white list 500, a mobile device (e.g., mobile device 350) may be permitted or denied access to wireless service(s) associated with a mobile network operator (e.g., one of mobile network operators 160, 170) through an appropriate vBTS transmitting a signal stronger than the signal associated with the wireless service. In embodiments, server 255 may store the database which includes information associated with the mobile devices.

In FIG. 5, an embodiment of the present invention shows the database 510 with fields such as mobile device 520, actual location 530 (e.g., within a coverage area of vehicles 110, 120, 130, 140, and 150, or unknown), name 540 (e.g., type of device), location 550 (e.g., within any of the coverage areas 290, 320, 330, and 340, or unknown), and access 560 (e.g., granted or denied). However, these are not to be construed as limiting features, and other fields may be included in database 510 shown in FIG.

Flow Diagram

Figure 6:
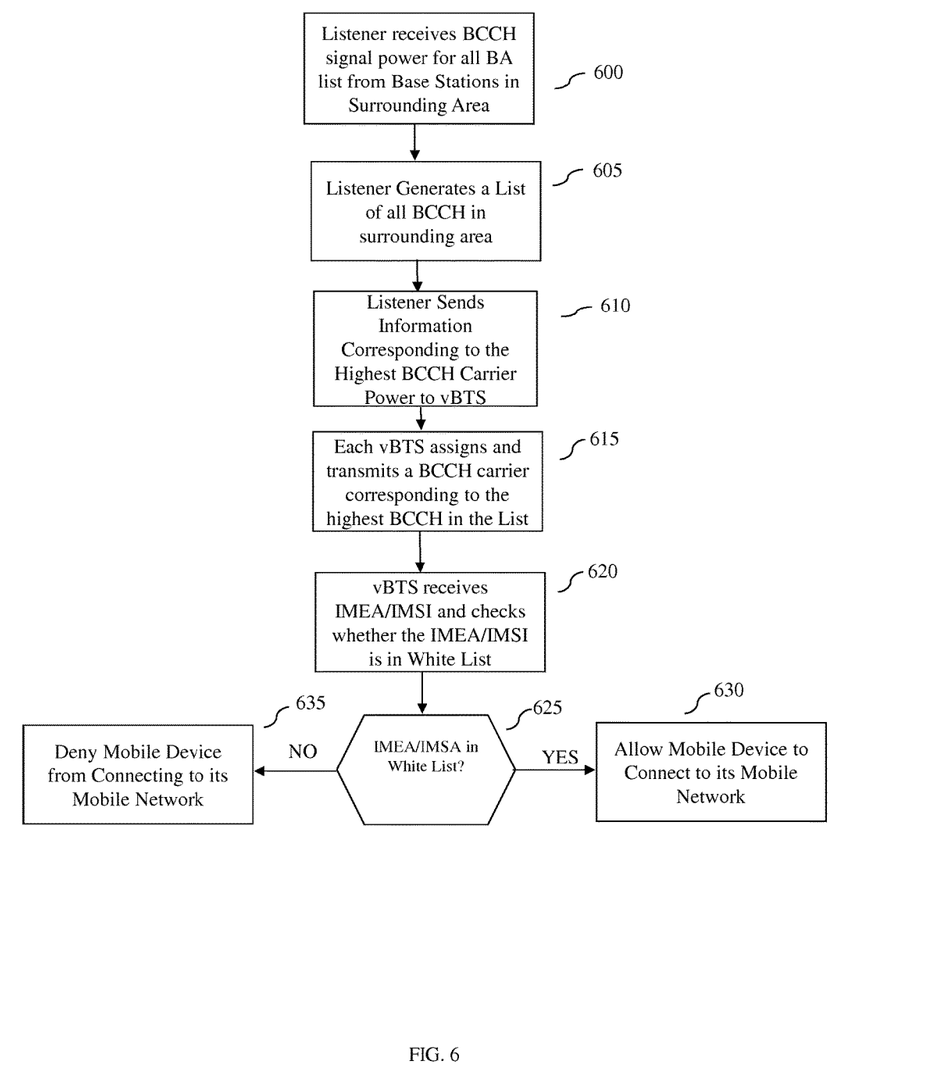
FIG. 6 shows a flow diagram implementing processes in accordance with aspects of the present invention.

FIG. 6 shows a flow diagram implementing aspects of the present invention. The flow diagram may equally represent a high-level block diagram or a swim-lane diagram of the invention. The steps of the flow diagram may be implemented and executed from either a server, in a client server relationship, or they may run on a user workstation with operative information conveyed to the user workstation as represented in FIG. 1.

Furthermore, the invention can take the form of a computer program product accessible from a computer-usable or computer-readable medium providing program code for use by or in connection with a computer or any instruction execution system. The software and/or computer program product can be implemented in the environment of FIG. 1. The computer-usable or computer-readable medium and computer program product are physical, tangible devices or other storage and are non-transitory medium, e.g., not a signal per se.

In particular, FIG. 6 shows a flow diagram detailing the operations of allowing or denying access to a mobile network for a mobile device in accordance with aspects of the invention. At step 600, the listener (e.g., vehicle 110) leads a convoy by a predetermined distance and receives frequency bands of base stations in the surrounding area that are picked up by the receiving radio. In particular, at step 600, the listener continuously receives BCCH signal power for different BA lists from all base stations in the surrounding area, which contains frequency bands used by a specific base station as well as frequency bands used by neighboring base stations.

At step 605, listener generates a list of all BCCH carrier powers in the BA lists. At step 610, the listener communicates information about the BCCH signal corresponding to the highest carrier power received from all surrounding base stations to all vBTSs in the convoy (e.g., vBTS2, vBTS3, vBTS4, and vBTS5 corresponding to vehicles 120, 130, 140, and 150). At step 615, when the highest BCCH carrier power is received at each vBTS in the convoy, each vBTS assigns a BCCHx signal corresponding to the highest BCCH received from the listener. Then, at step 615, each vBTS in the convoy transmits the BCCHx at power PBCCHx that is higher than the strongest signal which the listener has recorded such that:

$PBCCHx = \max(PBA\text{list}) + k1.$

At step 620, a mobile device that enters into the combined coverage area of the convoy will be attracted by the carrier BCCHx transmitted by the vBTSs at a power PBCCHx that is higher than the strongest signal which the listener (e.g., vehicle 110) has recorded, and consequently will send its IMEA/IMSA information to a vBTS. Further, at step 620, the vBTS checks whether the IMEA/IMSI is in a white list.

At step 625, the vBTS determines whether the IMEA/IMSI is in the white list. If the IMEA/IMSI is in the white list (i.e., YES at step 625), then at step 630, the vBTS will send a service denial message to the mobile device to cause that mobile device to disconnect from the vBTS so that the mobile device can connect to the network of the mobile network operator (e.g., the mobile network associated with cell sites 300, 310). Alternatively, if the IMEA/IMSI is not in the white list (i.e., NO at step 635), then at step 635, the vBTS will hold on to that mobile device and will not provide any service to the mobile device which consequently prevents the mobile device from connecting to the network of the mobile network operator.

The foregoing examples have been provided for the purpose of explanation and should not be construed as limiting the present invention. While the present invention has been described with reference to an exemplary embodiment, changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A method implemented in a computer infrastructure having computer executable code tangibly embodied in a computer readable storage medium having programming instructions configured to:
   collect, using a listener that is separate from and positioned ahead of a convoy by a predetermined distance, at least one broadcast control channel allocation list from base stations in a surrounding area;
   generate a list of power signals which correspond to all broadcast control channel carriers based on the at least one broadcast control channel allocation list collected by the listener;
   transmit, from the listener, information of a highest carrier power in the list to all virtual base stations in the convoy; and
   send, by at least one of the virtual base stations in the convoy, a service denial message to a device to prevent the device from connecting to the at least one of the virtual base stations and thereby permitting the device to connect to a wireless service of the base stations in the surrounding area based on identification information of the device matching information in a database,
   wherein the predetermined distance is determined based on a speed of the convoy and a time taken by the listener for the collecting and the transmitting.

2. The method of claim 1, wherein the at least one of the virtual base stations in the convoy holds a connection to the device in order to prevent the device from connecting to the wireless service of the base stations in the surrounding area based on the identification information of the device not matching the information in the database.

3. The method of claim 1, wherein the convoy comprises a plurality of vehicles, and each of the plurality of vehicles comprises a virtual base station which receives the information about the highest carrier power from the listener ahead of the convoy.

4. The method of claim 1, wherein the listener transmits information about the at least one broadcast control channel allocation list to all of the virtual base stations in the convoy.

5. The method of claim 1, wherein the highest carrier power, which corresponds to a strongest signal of all of the broadcast control channel carriers in the at least one broadcast control channel allocation list received by the listener is computed and transmitted to all of the virtual base stations in the convoy.

6. The method of claim 1, wherein the predetermined distance is greater than 500 meters.

7. The method of claim 1, wherein all of the virtual base stations in the convoy are separated from each other by a distance less than their coverage area such that a combined coverage area of the convoy is extended.

8. The method of claim 7, wherein the predetermined distance is greater than the coverage area of the virtual base stations in the convoy.

9. The method of claim 1, wherein the at least one of the virtual base stations generates a broadcast control channel carrier signal which has a power higher than all of the base stations in the surrounding area.

10. The method of claim 9, wherein the at least one of the virtual base stations transmits the generated broadcast control channel carrier signal which has the power higher than all of the base stations in the surrounding area to attract at least one mobile device within a coverage area of the at least one of the virtual base stations.

11. A computer program product comprising a computer readable storage medium having program instructions embodied therewith, wherein the computer readable storage medium is not a transitory signal per se, and the program instructions are readable by a computing device to cause the computing device to perform a method comprising:

receiving, from a listener that is separate from and positioned ahead of a convoy by a predetermined distance, a highest carrier power associated with power signals of base stations in a surrounding area;

transmitting, by at least one virtual base station in the convoy, a signal which is higher than the highest carrier power associated with the power signals of the base stations in the surrounding area;

receiving identification information from at least one device; and controlling the at least one device in response to a match or mismatch of the received identification information associated with the at least one device with identification information in a database by sending a service denial message to the at least one device to prevent the at least device from connecting to the at least one virtual base station in the convoy receiving the highest carrier power associated with the power signals of the base stations in the surrounding area and thereby permitting the at least one device to connect to a wireless service of network operator base stations in the surrounding area in response to the received identification information from the device matching the identification information in the database, wherein the predetermined distance is determined based on a speed of the convoy and a time taken by the listener to determine and transmit the highest carrier power.

12. The computer program product of claim 11, wherein the at least one virtual base station in the convoy prevents the at least one device from accessing the wireless service provided by base stations of a mobile network operator in the surrounding area based on the received highest carrier power.

13. The computer program product of claim 11, wherein the controlling the at least one device in response to the match or mismatch of the received identification information associated with the at least one device with the identification information in the database further comprises:

holding a connection to the at least one device through the at least one virtual base station in order to prevent the at least one device from connecting to the wireless service of the network operator base stations in the surrounding area in response to the received identification information from the device mismatching the identification information in the database.

14. The computer program product of claim 11, wherein the convoy comprises a plurality of vehicles, each of the plurality of vehicles comprises at least one virtual base station which receives information about surrounding base stations from the listener ahead of the convoy.

15. The computer program product of claim 14, wherein each virtual base station in the convoy is separated from each other by a distance less than its coverage area.

16. A computer system for providing a service, the system comprising:

a CPU, a computer readable memory and a computer readable storage media;

first program instructions to receive, from a listener that is separate from and positioned ahead of a convoy by a predetermined distance, information about a highest carrier power associated with power signals of surrounding base stations, and generate and transmit a signal which is stronger than the highest carrier power associated with the power signals of the surrounding base stations;

second program instructions to receive identification information from a device in response to transmitting the signal which is stronger than the highest carrier power associated with the power signals of the surrounding base stations;

third program instructions to verify that the received identification information matches identification information in a database; and fourth program instructions to send a service denial message to the device to cause the device to connect to the wireless service in the surrounding area in response to verifying that the received identification information matches the identification information in the database, wherein the first, second, third, and fourth program instructions are stored on the computer readable storage media for execution by the CPU via the computer readable memory, and wherein the predetermined distance is determined based on a speed of the convoy and a time taken by the listener to determine and transmit the information about the highest carrier power.

17. The computer system of claim 16, wherein the identification information is at least one of an international mobile subscriber identity (IMSI) number and an international mobile station equipment identify (IMEI) number.

18. The computer system of claim 16, wherein the database is a white list which comprises a list of devices which are allowed to connect to the wireless service.

19. The computer system of claim 16, wherein the signal is transmitted by at least one virtual base station in the convoy.

20. The computer system of claim 19, wherein the convoy comprises a plurality of vehicles, and each of the plurality of vehicles comprises at least one virtual base station.

* * * * *